US00RE35120E

United States Patent [19]

Heaney

[11] E Patent Number: Re. 35,120

[45] Reissued Date of Patent: Dec. 12, 1995

[54] DISPLAY TYPE REFRIGERATOR/FREEZER CABINET

[75] Inventor: James J. Heaney, Glendale, Calif.

[73] Assignee: Anthony's Manufacturing Company, Inc., San Fernando, Calif.

[21] Appl. No.: 116,729

[22] Filed: Sep. 3, 1993

Related U.S. Patent Documents

Reissue of:

[64] Patent No.: 4,477,129
Issued: Oct. 16, 1984
Appl. No.: 389,675
Filed: Jun. 18, 1982

U.S. Applications:

[62] Division of Ser. No. 187,558, Sep. 15, 1980, Pat. No. 4,382,177.

[51] Int. Cl.[6] ..... A47F 3/04

[52] U.S. Cl. ..... 312/116; 52/171.1; 52/786.1

[58] Field of Search ..... 312/116; 52/171, 52/788, 178, 811; 428/34, 913, 432; 350/1.6; 62/248, 255; 219/218; 126/200

[56] References Cited

U.S. PATENT DOCUMENTS

| | | | |
|---|---|---|---|
| 2,444,976 | 7/1948 | Brown . | |
| 3,377,626 | 4/1968 | Smith . | |
| 3,499,697 | 3/1970 | Edwards . | |
| 3,591,248 | 3/1971 | Meunier . | |
| 3,597,586 | 8/1971 | Rebovich . | |
| 3,612,825 | 10/1971 | Chase et al. . | |
| 3,659,079 | 4/1972 | Whittemore . | |
| 3,710,074 | 1/1973 | Stewart . | |
| 3,790,748 | 2/1974 | Laethem et al. . | |
| 3,806,462 | 4/1974 | Bloom . | |
| 3,833,451 | 9/1974 | Wagner . | |
| 3,860,306 | 1/1975 | Kenyon . | |
| 3,935,351 | 1/1976 | Franz . | |
| 3,974,359 | 8/1976 | Orcutt et al. . | |
| 4,022,947 | 5/1977 | Grubb et al. . | |
| 4,035,608 | 7/1977 | Stromquist | 62/248 |
| 4,048,978 | 9/1977 | Plumat et al. | 126/200 |
| 4,057,671 | 11/1977 | Shoop . | |
| 4,069,630 | 1/1978 | Chess et al. . | |
| 4,071,736 | 1/1978 | Kamerling . | |
| 4,102,722 | 7/1978 | Shoop . | |
| 4,127,765 | 11/1978 | Heaney . | |
| 4,149,348 | 4/1979 | Pyzewski . | |
| 4,180,954 | 1/1980 | Gell, Jr. . | |
| 4,187,336 | 2/1980 | Gordon . | |
| 4,206,252 | 6/1980 | Gordon . | |
| 4,206,615 | 6/1980 | Sobajima et al. | 62/248 |
| 4,377,613 | 3/1983 | Gordon . | |
| 4,382,177 | 5/1983 | Heaney | 62/248 |
| 4,440,822 | 4/1984 | Gordon . | |
| 4,455,479 | 6/1984 | Itoh et al. | 126/200 |

FOREIGN PATENT DOCUMENTS

| | | |
|---|---|---|
| 2113876 | 10/1972 | Germany . |
| 1364712 | 10/1971 | United Kingdom . |

*Primary Examiner*—Kenneth J. Dorner
*Assistant Examiner*—Gerald A. Anderson
*Attorney, Agent, or Firm*—Poms, Smith, Lande & Rose

[57] ABSTRACT

A substantially transparent single-pane insulating structure, positionable between a warmer region and a colder region having a substantially transparent pane wherein one surface is exposed in use to the warmer region and the opposed surface in use facing the cold region and a reflecting material applied to the surface of the pane which faces the colder region for reflecting a substantial portion of infrared radiation incident on the reflecting material through the pane to the surface of the pane exposed in use to the warmer region to restrict substantial transmission of infrared radiation from the warmer region to the colder region and to heat the surface of the pane exposed in use to the warmer region sufficiently to prevent formation of a visibility-impeding layer thereon without using electrical energy therefor and wherein the reflected infrared radiation is reradiated into the warmer region so as to inhibit reradiation thereof into the colder region and for transmitting a substantial portion of visible light radiation incident on the reflecting material to enable substantially clear visibility therethrough is shown.

4 Claims, 4 Drawing Sheets

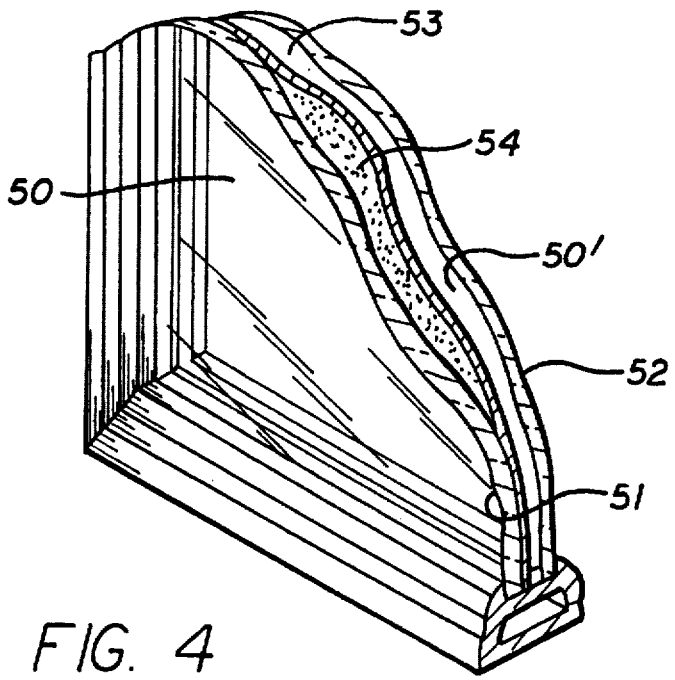
FIG. 4
FIG. 5
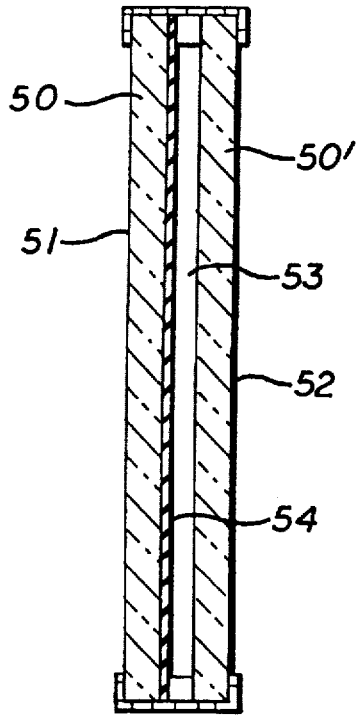
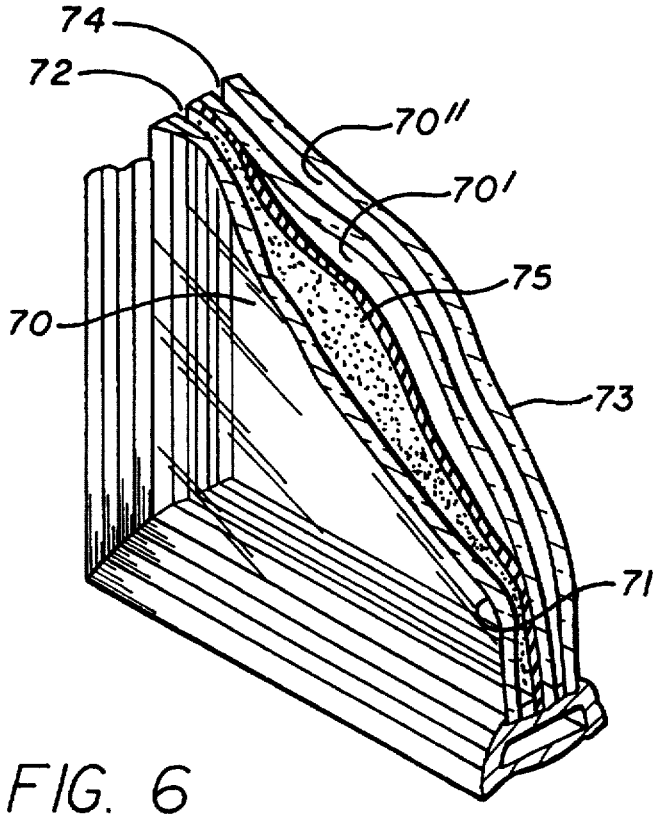
FIG. 6
FIG. 7
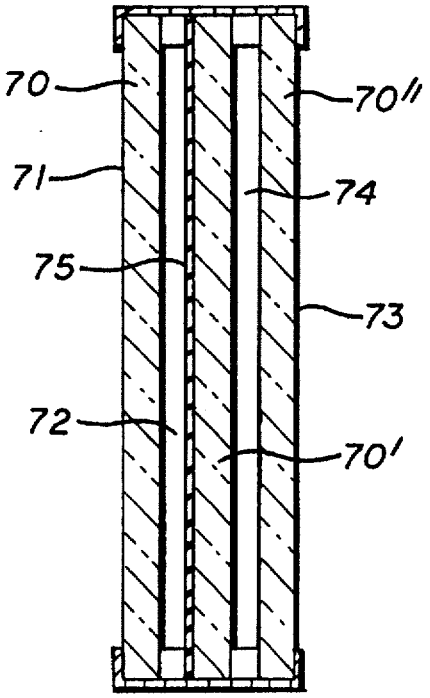

DISPLAY TYPE REFRIGERATOR/FREEZER CABINET

Matter enclosed in heavy brackets [ ] appears in the original patent but forms no part of this reissue specification; matter printed in italics indicates the additions made by reissue.

This application is a division of Ser. No. 187,558, filed Sept. 15, 1980, now U.S. Pat. No. 4,382,177.

BACKGROUND OF THE INVENTION

1. Field of the Invention

The present invention is in the field of insulating devices and, more particularly, a substantially transparent insulating structure, having an infrared reflecting visible light transmitting coating applied to one surface thereof.

2. Description of the Prior Art

It is presently known to provide a substantially transparent multi-pane insulating structure, which functions so as to inhibit transmission of infrared radiation from a warmer region to a colder region. The structure may typically comprise two or more panes, spaced apart by spacers which extend about the top, bottom, and sides thereof so as to form at least one insulating airspace therebetween. The panes may be bonded together, and a frame may extend about the edges thereof. Such a multi-pane structure may comprise a glass door for a refrigerated cabinet or freezer compartment.

Generally, such multi-pane structures provide substantially more insulation than single-pane structures. However, multi-pane structures are also more expensive than single-pane structures. It is therefore desirable to provide a single-pane structure which provides substantial insulation so as to inhibit transmission of infrared radiation from a warmer region to a colder region.

Further, there is a tendency in such insulating structures for the temperature of the surface exposed in use to the warmer region to attain the temperature at which a visibility-impeding layer may form thereon, by virtue of the temperature differential between the warmer region and the colder region. The visibility-impeding layer may take the form of condensation on a refrigerated cabinet glass door, or frost on a freezer compartment glass door. The formation of such layer tends to occur as a consequence of the temperature differential between the warmer and colder regions, by virtue of the fact that the surface exposed in use to the warmer region is generally at a cooler temperature than the ambient air in the warmer region due to heat loss by radiation and conduction. Since the door occupies a substantial portion of the front of the cabinet, formation of the visibility-impeding layer therein prevents customers from viewing products stored and displayed in such cabinet or compartment, and is aesthetically unattractive and unappealing.

To counter the tendency for condensation and frost to form on the surface of the pane exposed in use to the warmer region, it is known in the art to provide electrical heating means which heat such surface. Various types of electrical heating means have been used, including conductive coatings and resistive wires. Preferably, the conductive coating is visible light transmitting, to enable viewing of products stored and displayed in the cabinet or compartment, and is applied to the surface of the pane facing into the airspace for protection of the coating.

Electrical heating means use substantial quantities of electricity in the operation thereof, which is expensive and inefficient. Nevertheless, use of electricity is necessary in presently known devices to prevent formation of the visibility-impeding layer, so that customers may view products stored and displayed in the cabinet or compartment, and to maintain the attractiveness of the panes. Use of substantial quantities of electricity to heat the pane is particularly necessary where the air in the warmer region has a high moisture content.

It is presently further known to provide infrared filtering visible light transmitting means in such structures, to prevent transmission of infrared radiation therethrough while transmitting visible light.

Transmitting infrared radiation into a colder region increases the heat content thereof, necessitating use of substantial quantities of electricity in operating the refrigeration system to remove such heat from the colder region. These problems arise particularly with respect to refrigerators and freezers.

Various types of infrared filtering visible light transmitting means are presently known. One type of such means is an infrared absorber shown, for example, in Brown U.S. Pat. No. 2,444,976. Brown shows an absorption glass including a composition mixed in the batch during manufacture of the glass, which composition absorbs infrared radiation incident thereon. However, infrared absorbing materials, as in Brown, increase the heat content of the structure. A substantial portion of the absorbed infrared radiation is released back therethrough by conduction and reradiation. This substantially reduces the operating efficiency and utility of such means.

Another type of infrared filtering visible light transmitting means presently known comprises film or laminate applied to a surface of a pane. Such means are shown, for example, in Edwards U.S. Pat. No. 3,499,697. Edwards shows a transparent laminate including a pair of panels, a pair of thin plastic films, and multi-layer and single-layer dielectric films, sandwiched together to provide a laminate which selectively transmits visible light and reflects infrared radiation. Here, as in Brown, the reflected infrared radiation is released back by convection and reradiation.

Still another type of infrared filtering visible light transmitting means presently known comprises a multi-pane insulating structure with an infrared filtering film applied to one surface of one of the panes. For example, U.S. Pat. No. 4,035,608, Stromquist, et al., illustrates use of an infrared reflecting visible light transmitting film applied to the inside surface of the second pane from the warmer region, and a first pane adjacent the warmer region electrically heated to prevent formation of a visibility-impeding layer on the outside surface thereof. The heating means are electrically operated, and are used to prevent formation of condensation or frost. Since the heating means require use of electrical energy for operation therefor, the expense of operation thereof is substantial. This is particularly true with respect to refrigerators and freezers, as there are normally substantial temperature differentials between the ambient warmer region and the colder region, and as the panes occupy a very substantial portion of the selectively openable interface between the warmer region which may include humid ambient air, and the colder region. Further, the electrical heating means radiate heat to the second pane, as well as the first, and such heat radiation interferes with and reduces the efficiency of the coating in reflecting infrared radiation.

It is further presently known to provide a guard for a fluorescent lamp in a refrigerated cabinet. The guard extends substantially the length of the fluorescent lamp and is spaced therefrom so as to form an airspace thereabout. In operation of the cabinet, the airspace constitutes a warmer region, and the surrounding refrigerated air constitutes a colder region. The guard is reusable, and typically need not be disposed of when the fluorescent lamp is replaced.

Infrared radiation may be transmitted from the warmer region in the guard-defined airspace to the colder region in the refrigerated cabinet through the guard, heating the colder region and removing heat from the warmer region. Loss of heat to the colder region reduces the efficiency of operation of the fluorescent lamp and increases the heat load in the colder region within the cabinet, reducing the operating efficiency of the refrigerated system while increasing its expense of operation. On the other hand, increased heat in the warmer region within the guard could provide an environment which would increase the efficiency of operation of the fluorescent lamp.

The problems addressed by the present invention include preventing transmission of infrared radiation from a warmer region to a colder region, preventing formation of a visibility-impeding layer on a surface of a structure exposed in use to a warmer region, preventing reradiation of reflected infrared radiation, and enabling transmission of visible light radiation.

It is normally necessary to use a multi-pane insulating structure to provide insulation sufficient to enable efficient operation of a refrigerated cabinet or freezer compartment. However, if a single-pane insulating structure is used pursuant to presently known devices, such structure is substantially less effective than a multi-pane insulating structure in preventing transmission of infrared radiation from the warmer region outside the cabinet or compartment to the colder region inside the cabinet or compartment. On the other hand, if such a multi-pane insulating structure is used, it is substantially more expensive than a single-pane structure.

It is further normally necessary, pursuant to presently known devices, to use electrical heating means to heat the surface exposed in use to the warmer region to a temperature above the temperature at which a visibility-impeding layer forms. This approach imposes expense and inefficiency upon the insulating structure, particularly where there is a large temperature differential between the warmer region and the colder region, and where the warmer region may include humid ambient air.

Still further, presently known fluorescent lamp guard devices transmit heat generated by the fluorescent lamp to the colder air in a refrigerated cabinet, interfering with the most efficient operation of the fluorescent lamp and of the refrigerated cabinet.

Thus, particular problems arise. If a single-pane structure pursuant to presently known devices is used, such structure is substantially less effective than a multi-pane structure to prevent transmission of infrared radiation from a warmer region to a colder region. However, if a multi-pane structure is used, such structure is substantially more expensive than a single-pane structure. Further, if the surface of the insulating structure exposed in use to the warmer region is not heated electrically pursuant to presently known structures, a visibility-impeding layer forms, which prevents customers from viewing merchandise stored and displayed in the colder region. However, if the surface is heated electrically, a substantial expense is incurred as a result of the use of substantial quantities of electricity necessary for operation thereof. Still further, if a guard is used pursuant to presently known structures so as to protect a fluorescent lamp in a refrigerated cabinet, heat in the airspace surrounding the fluorescent lamp is dissipated by transmission thereof into the colder region, which reduces the operating efficiency of the fluorescent lamp. These are the particular problems for which the present invention provides novel solutions.

SUMMARY OF THE INVENTION

The present invention provides a substantially transparent insulating structure, which restricts substantial transmission of infrared radiation from a warmer region to a colder region, which inhibits formation of a visibility-impeding layer on the surface thereof exposed in use to the warmer region without using electricity therefor, and which inhibits reradiation of the reflected infrared radiation, while enabling transmission of visible light radiation.

The improvements in substantially transparent insulating structures are provided by use of an infrared reflecting coating which reflects a substantial portion of infrared radiation incident thereon. The coating inhibits transmission of infrared radiation from the warmer region to the colder region, thus reducing heat transfer into the colder region. The coating transmits a substantial portion of visible light radiation, thus enabling customer viewing of products stored and displayed in the colder region. The reflecting means reflect a substantial portion of infrared radiation incident thereon, so as to heat the surface of the pane exposed in use to the warmer region sufficiently to prevent formation of the visibility-impeding layer thereon, without using electricity therefor, thus substantially reducing operating costs. The reflected infrared radiation is reradiated into the warmer region, thereby inhibiting heat transfer into the colder region. The reflecting means enable use of a single-pane structure with insulating capabilities equal to or better than uncoated multi-pane structures, while substantially reducing the cost of such structures. The single pane structure preferably includes an antiabrasion coating applied over the infrared reflecting coating, to protect the infrared reflecting coating from abrasion which might otherwise result from contact therewith. The antiabrasion coating enables use of the single pane structure where contact may occur, as in refrigerated cabinets or freezer compartments. A multi-pane structure would otherwise be necessary to protect the infrared reflecting coating from abrasion.

The substantially transparent insulating structure of the present invention has utility in doors for refrigerated cabinets and freezer compartments, particularly for commercial cabinets and compartments used for storing and displaying food products in retail food stores. The structure has further utility in a guard for a fluorescent lamp in a refrigerated cabinet.

The novel features which are characteristic of the invention, both as to structure and method of operation thereof, together with further objects and advantages thereof, will be understood from the following description, considered in connection with the accompanying drawings in which several preferred embodiments of the invention are illustrated by way of example. It is to be expressly understood, however, that the drawings are for the purpose of illustration and description only, and are not intended as a definition of the limits of the invention.

DESCRIPTION OF THE DRAWINGS

The invention is illustrated, by way of example thereof, in the accompanying drawings wherein:

FIG. 4 is a perspective fragmentary view of the substantially transparent insulating structure in a double-pane embodiment thereof pursuant to the invention;

FIG. 5 is a side cross-sectional elevational view thereof in accordance with the invention;

FIG. 6 is a perspective fragmentary view of the substantially transparent insulating structure in a triple-pane embodiment thereof pursuant to the invention;

FIG. 7 is a side cross-sectional elevational view thereof in accordance with the invention;

DESCRIPTION OF THE PREFERRED EMBODIMENTS

Figure 1:
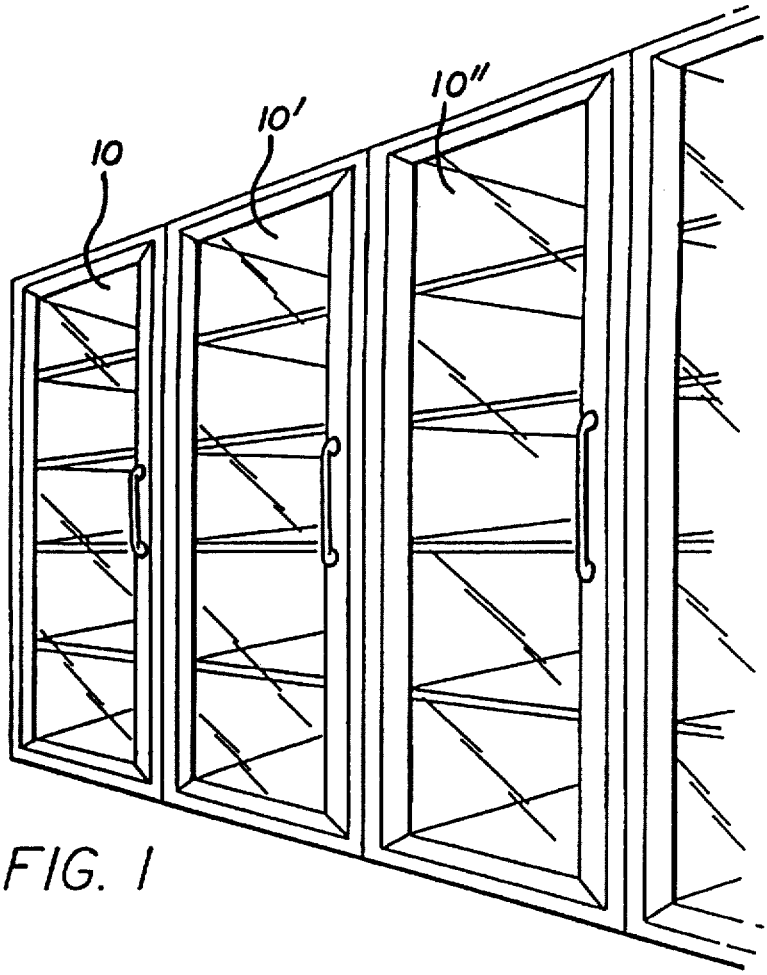
FIG. 1 is a perspective view of a substantially transparent insulating structure in a refrigerated cabinet door embodiment thereof pursuant to the invention.

Referring to the drawings, FIGS. 1–7 show a substantially transparent insulating structure used as a door for a commercial refrigerated cabinet. In this embodiment, as shown in FIG. 1, each door 10, 10', 10" comprises a selectively openable interface between a warmer region outside the cabinet and a colder region inside the cabinet. Each door constitutes a substantial portion of the front of the cabinet, and includes a pane which comprises a substantial portion of the door, to enable customer viewing of products displayed and stored in the refrigerated cabinet.

Figure 2:
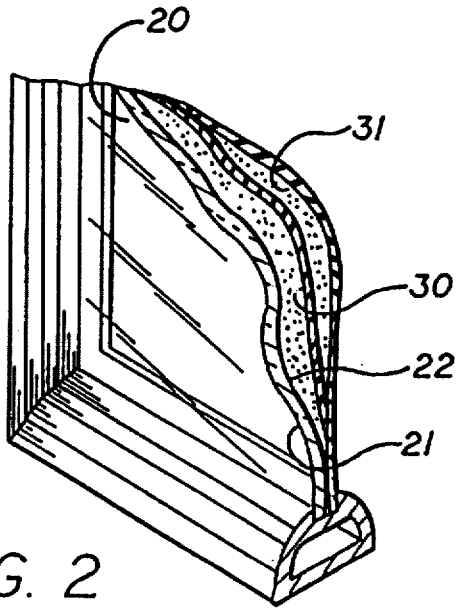
FIG. 2 is a perspective fragmentary view of the substantially transparent insulating structure in a single-pane embodiment pursuant to the invention.
Figure 3:
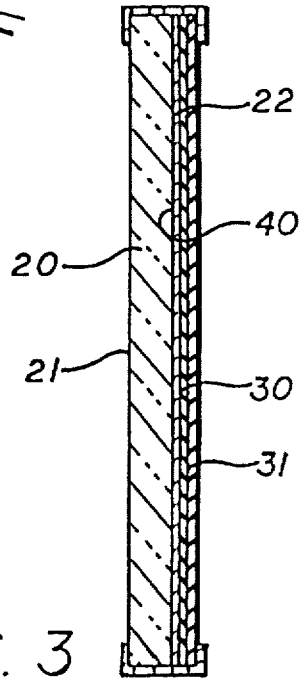
FIG. 3 is a side cross-sectional elevational view of the single-pane embodiment with electrical heating means applied thereto in accordance with the invention.

There are shown in FIGS. 2–3 perspective and cross-sectional views of the insulating structure in a single-pane embodiment thereof. It is necessary for use of such pane to prevent formation thereon of a visibility-impeding layer, such as condensation or frost, in an efficient and economical manner. This is particularly true where the warmer region has a high moisture content.

The present invention enables such objectives to be satisfied by means of a novel composite insulating structure. The substantially transparent insulating structure is positionable between a warmer region outside the refrigerated cabinet and a colder region inside the refrigerated cabinet. The structure includes a substantially transparent pane 20, one surface 21 of which is exposed in use to the warmer region, the opposite surface 22 of which faces the colder region in use.

Infrared radiation from the warmer region may be transmitted through pane 10 to the colder region, if insulation is not provided. To inhibit such transmission, it is presently known to provide an insulating structure which includes at least two panes of transparent material, such as glass. The panes of transparent material are spaced from each other by spacers to form an airspace therebetween. The airspace may be dead air or partially evacuated to provide insulation. If the panes are separated by dead airspace, it is presently known to fill such airspace with dry air and include dessicant material therein. The structure is held together by a surrounding U-shaped frame member and typically includes a sealing gasket (not shown) to prevent leakage of air between the inside and outside of the refrigerated cabinet.

Generally, a single-pane structure provides substantially less insulation than a multi-pane configuration. Single-pane structures, however, are less expensive than multipane structures. Thus, means for insulating against the transmission of infrared radiation from a warmer region to a colder region in a single-pane configuration would provide substantial benefits. Further, such insulating means, provided as a coating of a surface in a single-pane configuration, must be protected from abrasion due to exposure thereof to contact.

Further, the surface 22 of pane 20 exposed in use to the colder region is no colder than the temperature of the colder region and is generally warmer. Thus, no visibility-impeding layer, such as condensation or frost, will normally form thereon. The warmer region, on the other hand, particularly where it includes humidity-bearing air, may generate formation of a visibility-impeding layer, such as condensation, on surface 21 of pane 20 exposed in use thereto. Pane 20 comprises a substantial portion of the door, and the door occupies a substantial portion of the front of the cabinet. Therefore, such visibility-impeding layer, if formed on pane 20, would prevent customer viewing of products stored and displayed in the colder region, and would be unattractive and unappealing.

To prevent formation of the visibility-impeding layer it is presently known, in a multi-pane configuration, to use electrical heating means to heat the pane adjacent the warmer region, so that the temperature of such pane is above the dew point temperature of warmer ambient air adjacent the surface thereof exposed to the warmer region. Electrical heating means consume substantial quantities of electricity. Consumption of electricity is expensive and inefficient. Further, the electrical heating means radiate heat towards the colder region and into the refrigerated cabinet. Heat transmitted into the colder region must be removed by the refrigeration system, thus increasing the heat load and increasing the expense of operation thereof. Thus, it is desirable to provide means for preventing formation of a visibility-impeding layer on surface 21 of pane 20 exposed in use to the warmer region, without using electrical energy therefor, and while preventing reradiation of such infrared radiation. It is further desirable to transmit visible light radiation, to enable customers to clearly view products stored and displayed in the refrigerated cabinet.

The present invention accomplishes these objectives by providing an infrared reflecting visible light transmitting coating 30, applied to surface 22 of pane 20 exposed in use to the colder region. By virtue of such coating 30, a substantial portion of infrared radiation incident thereon from the warmer legion is reflected through pane 20 to surface 21 of pane 20 exposed in use to the warmer region, preventing infrared radiation from entering the colder region, and reducing the heat load on the refrigerating system. A substantial portion of infrared radiation is reflected to heat surface 21 of pane 20, sufficient to prevent formation of the visibility-impeding layer thereon without using electricity therefor. This eliminates the expense of use of electricity while increasing the efficiency of operation. Coating 30 enables customer viewing of products stored and displayed in the colder region by transmitting visible light radiation sufficient to enable substantially clear visibility therethrough. In using reflected infrared radiation to heat surface 21 of pane 20 exposed in use to the warmer region so as to prevent formation of a visibility-impeding layer, reflected infrared radiation is reradiated into the warmer region, thereby inhibiting reradiation thereof into the colder region, further increasing the efficiency of operation of the insulating structure. The use of the single-pane configuration reduces the cost of the insulating structure over double-pane configurations, while coating 30 provides such configuration with insulation capibilities equal to or better than uncoated double-pane configurations. An antiabrasion coating 31 is applied over coating 30 to protect coating 30 from abrasion which might otherwise result from contact therewith.

A suitable infrared reflecting visible light transmitting coating for use in the preferred embodiments of the invention is of the type produced by Teijin Limited, Tokyo, Japan, under its designation "Heat Reflection Film," having the characteristics of 95% infrared reflectance and 82% visible light transmittance. Such coating includes a polyester film, on which multiple rare earth depositions are performed, and is preferably thin, having a thickness of 0.001", and flexible. The coating is substantially transparent optically, and does not interfere with transmission of visible light radiation, so as to provide substantially clear visibility therethrough. The coating is highly efficient in reflecting sufficient infrared radiation to prevent the formation of condensation, without using electricity therefor, and in reducing the temperature of products stored and displayed in the colder region, while reducing use of electrical energy otherwise necessary to remove additional heat from the colder region.

The materials used for antiabrasion coatings and processes for depositing them are known in the art. Such materials and processes, for example, are described in U.S. Pat. No. 3,806,462, issued to Bloom.

FIG. 3 shows the single-pane embodiment of such insulating structure, to which means for electrically heating the pane are additionally applied. Such means comprise conductive coating 40, applied to surface 22 of pane 20 which in use faces the colder region, with coating 30 applied over coating 40. An antiabrasion coating 31 is preferably applied over coating 30 to protect coating 30 from abrasion which might otherwise result from contact therewith.

In such embodiment, coating 30 reflects a substantial portion of infrared radiation incident thereon through pane 20 to surface 21 of pane 20 exposed in use to the warmer region, heating the surface sufficiently, in combination with the heating provided by coating 40, to prevent formation of the visibility-impeding layer thereon, while minimizing use of electrical energy therefor.

The materials used for conductive coatings and processes for depositing them are known in the art. Such materials and processes, for example, are described in U.S. Pat. No. 3,710,074, issued to Stewart.

FIGS. 4–5 show perspective and cross-sectional views of such insulating structure in a double-pane embodiment thereof. In this embodiment, the structure includes a substantially transparent first pane 50, one surface 51 thereof being exposed in use to the warmer region, and a substantially transparent second pane 50', one surface 52 thereof being exposed in use to the colder region, spaced apart from the first pane 50' so as to form an airspace 53 therebetween. An infrared reflecting visible light transmitting coating 54 is applied to the inside surface of pane 50 facing into the airspace 53 between panes 50, 50'. Such coating 54 may alternatively be applied to the inside surface of pane 50' facing into the airspace between panes 50, 50'. Coating 54 functions in the manner set forth above with respect to coating 30 in the single-pane embodiment shown in FIG. 2.

Figure 8:
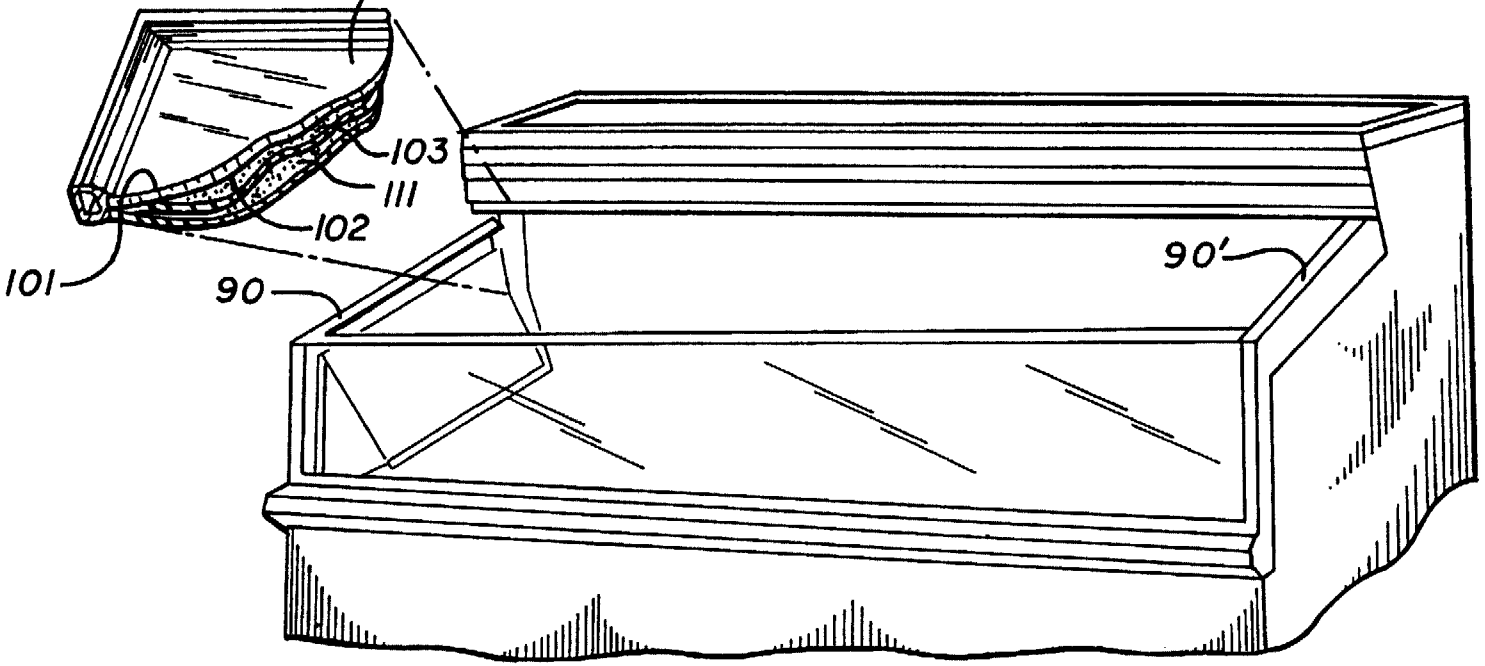
FIG. 8 is a perspective partly-exploded view of a substantially transparent insulating structure in a single-pane freezer compartment door embodiment pursuant to the invention.
Figure 9:
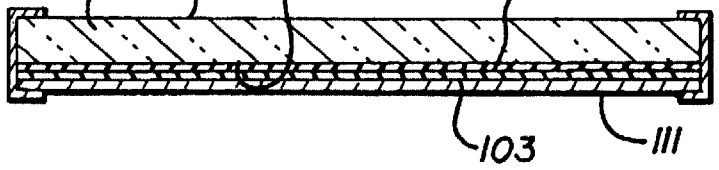
FIG. 9 is a side cross-sectional elevational view thereof in accordance with the invention.

In FIGS. 6–7 there are shown perspective and cross-sectional views of such insulating structure in a triple-pane embodiment thereof. The structure includes a substantially transparent first pane 70, one surface 71 thereof being exposed in use to the warmer region, a substantially transparent second pane 70', spaced apart from first pane 70 so as to form airspace 72 therebetween, and a substantially transparent third pane 70", one surface 73 thereof being exposed in use to the colder region, spaced apart from the second pane 70' so as to form an airspace 74 therebetween. An infrared reflecting visible light transmitting coating 75 is applied to the surface of pane 70' facing into the airspace 72 between panes 70, 70'. Alternatively, such coating 75 may be applied to the inside surface of pane 70' facing into the airspace 72 between panes 70, 70' or to the inside surfaces of panes 70', 70" facing into airspace 74 therebetween. Coating 75 functions in the same manner set forth above with respect to coating 30 shown in FIG. 2 in the single-pane embodiment. FIGS. 8–9 illustrate a substantially transparent insulating structure used as a door of a commercial freezer compartment. In this embodiment, as shown in FIG. 8, the door is oriented and operable in a substantially horizontal plane. The pane 100 comprises a substantial portion of the door between the warmer region and the colder region, to enable customer viewing of products displayed and stored therein.

In FIGS. 8–9, there are shown perspective and cross-sectional views of such insulating structure in the single-pane embodiment thereof for use in a freezer compartment. In FIG. 8, the structure is positionable in use in a substantially horizontal plane between the warmer region generally thereabove and the colder region generally therebelow, and includes a substantially transparent pane 100, one surface 101 being exposed in use to the warmer region, the other surface 102 in use facing the colder region. An infrared reflecting visible light transmitting coating 103 is applied to surface 102 of pane 100. In such embodiment, coating 103 reflects a substantial portion of infrared radiation incident thereon through pane 100 to surface 101 of pane 100 exposed in use to the warmer region, heating the surface sufficiently, in combination with infrared radiation rising substantially vertically through the pane 100, to prevent formation of the visibility-impeding layer thereon, without using electricity. In FIG. 9, the single-pane embodiment of FIG. 8 is shown, to which means for electrically heating the pane is additionally applied. The electrical heating means comprise conductive coating 110 applied to the surface 102 of pane 100 in use facing the colder region, with coating 103 applied over coating 110. An antiabrasion coating 111 is preferably applied over coating 103 to protect coating 103 from abrasion which might otherwise result from contact therewith. Coating 110 functions as set forth above with respect to the function of coating 30 in the single-pane embodiment shown in FIG. 3.

Figure 10:
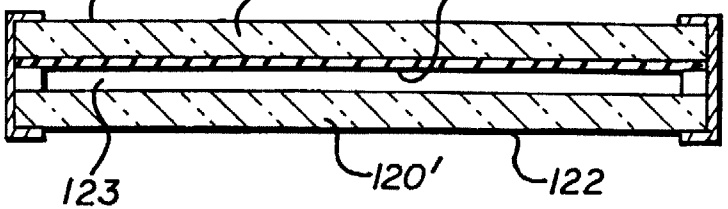
FIG. 10 is a side cross-sectional elevational view of a substantially transparent insulating structure in a double-pane freezer compartment door embodiment pursuant to the invention.

In FIG. 10, there is shown a cross-sectional view of such insulating structure in the multi-pane embodiment thereof for use in a freezer compartment. The structure is positionable in use in a substantially horizontal plane between the warmer region and the colder region, and includes a substantially transparent pane 120, one surface 121 being exposed in use to the warmer region, and a substantially transparent second pane 120', one surface 122 of which in use faces the colder region, spaced apart from the first pane 120 so as to form an airspace 123 therebetween. An infrared reflecting visible light transmitting coating 124 is applied to the inside surface of pane 120 facing into the airspace 123 between panes 120, 120'. In such embodiment, coating 124 reflects a substantial portion of infrared radiation incident thereon through first pane 120 to surface 121 of first pane 120 exposed in use to the warmer region, heating the surface sufficiently, in combination with infrared radiation rising substantially vertically through the first pane 120, to prevent formation of the visibility-impeding layer thereon, without using electricity.

Figure 13:
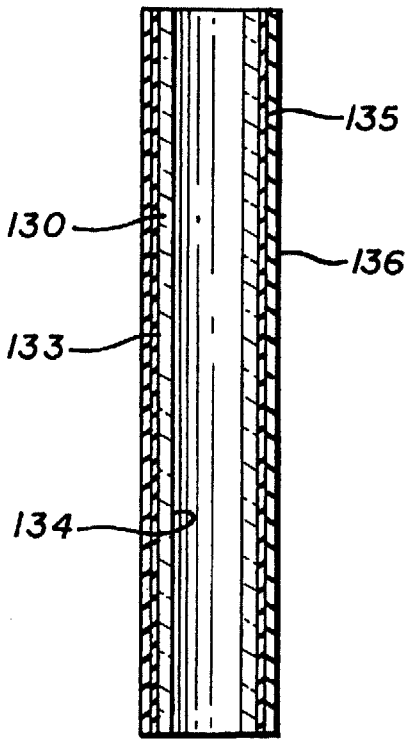
FIG. 13 is a side cross-sectional elevational view thereof in accordance with the invention.
Figure 12:
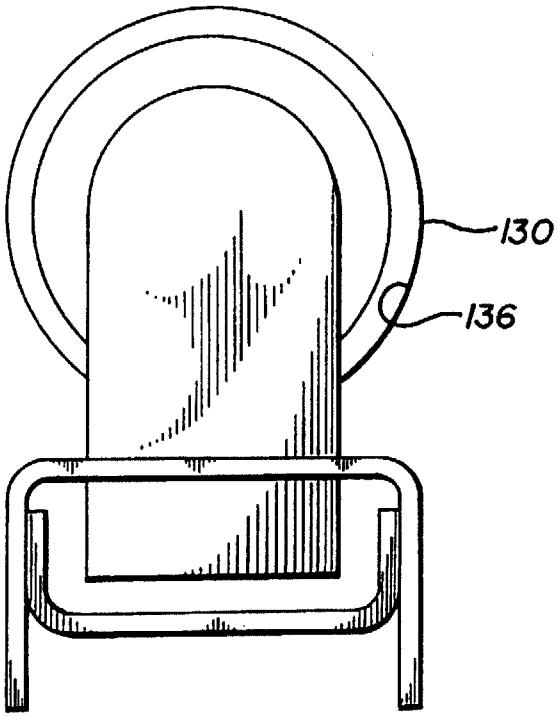
FIG. 12 is a top view thereof.
Figure 11:
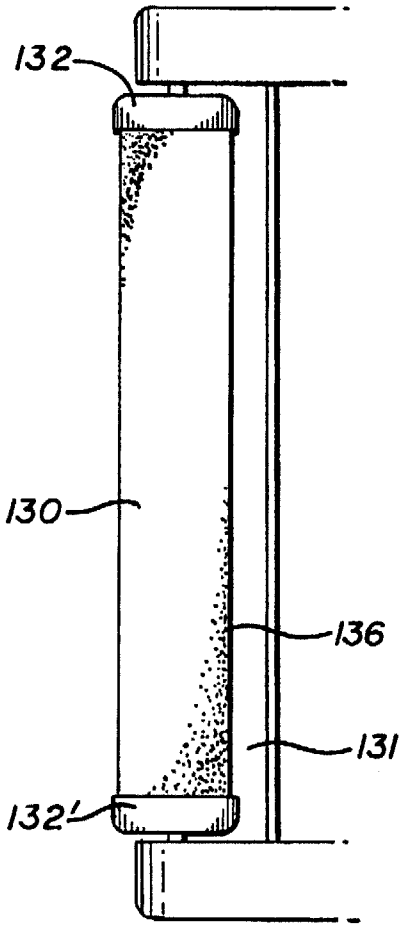
FIG. 11 is a front elevational partly fragmentary view of a substantially transparent or translucent insulating structure in a fluorescent lamp guard embodiment thereof pursuant to the invention.

FIGS. 11–13 show side, top and cross-sectional views of a substantially transparent structure used as a guard for a fluorescent lamp in a refrigerated cabinet. In this embodiment, as shown in FIGS. 11–13, the guard 130 extends about the fluorescent lamp substantially the length thereof and is spaced apart therefrom so as to form an airspace 131 thereabout, and end caps 132 and 132' retain the guard in position in the fixture and seal same from the interior of the cabinet.

There are shown in FIGS. 11 and 12 elevational and top views of such insulating structure, and in FIG. 13 a cross-sectional view thereof. The guard structure 130 is substantially transparent or translucent, one surface 136 being exposed to the interior of the cabinet, the opposite surface 134 facing the fluorescent lamp. An infrared reflecting visible light transmitting coating 135 is applied to the surface 136 of guard 130 facing into the interior of the cabinet. Alternatively, coating 135 may be applied to surface 134 of guard 130 facing the fluorescent lamp. In such embodiment, coating 135 reflects a substantial portion of infrared radiation incident thereon, to the fluorescent lamp in the warmer region, heating the fluorescent lamp sufficiently to increase the operating efficiency thereof, without using additional electrical energy therefor, while transmitting a substantial portion of the visible light radiation incident thereon. An antiabrasion coating 136 may preferably be applied over coating 135, to protect same from abrasion which might otherwise result from contact therewith.

Thus, there has been shown an insulating structure, substantially transparent to visible light, having an infrared reflecting visible light transmitting coating applied to a surface thereof. The coating enables use of a single-pane or multi-pane structure having substantial insulating capabilities. The coating further reflects a substantial portion of infrared radiation incident thereon, restricting substantial transmission of infrared radiation from the warmer region to the colder region. The reflected infrared radiation heats the surface of the structure exposed in use to the warmer region sufficiently to inhibit formation of a visibility-impeding layer thereon, without using electrical energy therefor. The reflected infrared radiation is reradiated into the warmer region, inhibiting reradiation thereof into the colder region. The coating still further transmits a substantial portion of visible light radiation, to enable substantially clear visibility therethrough. In a single pane structure, the coating provides insulating properties equal to or better than a double pane uncoated structure. The single pane structure further includes an anti-abrasion coating applied over the infrared reflecting coating, to protect the infrared reflecting coating from abrasion which might otherwise result from contact therewith. In a multi-pane structure, the coating provides increased insulating properties. In a structure positionable in use in a substantially horizontal plane between a warmer region thereabove and a colder region therebelow, infrared radiation reflected by the coating in combination with infrared radiation rising substantially vertically are sufficient to heat the surface exposed in use to the warmer region so as to inhibit formation of a visibility-impeding layer thereon without using electrical energy therefor. In a fluorescent lamp guard structure, the coating enables heating of the fluorescent lamp for more efficient operation thereof.

The foregoing description is illustrative of preferred embodiments of the invention. It is to be understood that additional embodiments thereof would be obvious to those skilled in the art. Therefore, the embodiments described herein, together with such additional embodiments, are within the scope of the invention. Thus, the invention is to be broadly construed, within the scope and spirit of the claims appended hereto.

I claim:

1. In a display type refrigerated cabinet having a transparent viewing area comprising a cabinet body for installation inside a building and for containing merchandise required to be kept at least colder than the ambient temperature in the region surrounding the cabinet, apparatus for maintaining the temperature in the region inside the cabinet at least colder than the ambient temperature region surrounding the cabinet and including transparent pane structure for viewing the contents inside the cabinet, the improvement wherein [at least some of] the transparent pane structure is a single pane having one surface directly exposed in use to the warmer ambient region outside the cabinet, and an opposed surface in use facing the colder region inside the cabinet, and having an infrared reflecting visible light transmitting coating applied to the surface facing the colder region for reflecting a substantial portion of infrared radiation incident on said coating from the warmer region, so as to restrict substantial transmission of infrared radiation from the warmer region to the colder region and so as to heat the surface of the pane exposed in use to the warmer region sufficiently to prevent formation of a visibility-impeding layer thereon by reradiation of the reflected infrared radiation back through the pane toward the warm region and for transmitting a substantial portion of visible light radiation incident on said coating, to enable substantially clear visibility therethrough.

2. The structure of claim 1 further comprising a second coating over the said coating for protecting said coating.

3. The structure of claim 1 wherein the pane is embodied in a door of said cabinet.

4. The structure of claim 3 wherein the door is oriented and openable in a substantially horizontal plane.

[5. The structure of claim 1 further comprising a second transparent pane, one surface being directly exposed in use to the colder region and the other surface being substantially parallel to and spaced from the first pane to form an airspace therebetween and the infrared reflecting visible light transmitting coating is applied to the surface of one of the panes facing into the airspace.]

* * * * *